Oct. 22, 1929.     C. J. TURNER     1,732,868
ANTITHEFT DEVICE FOR USE ON MOTOR VEHICLES AND THE LIKE
Filed Oct. 1, 1926
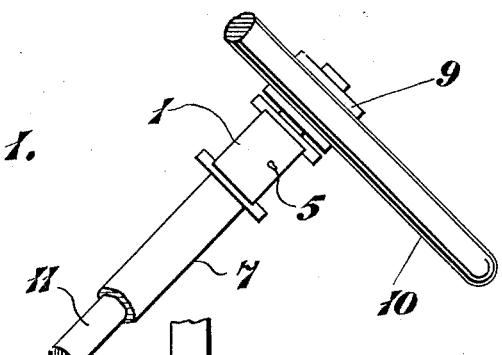
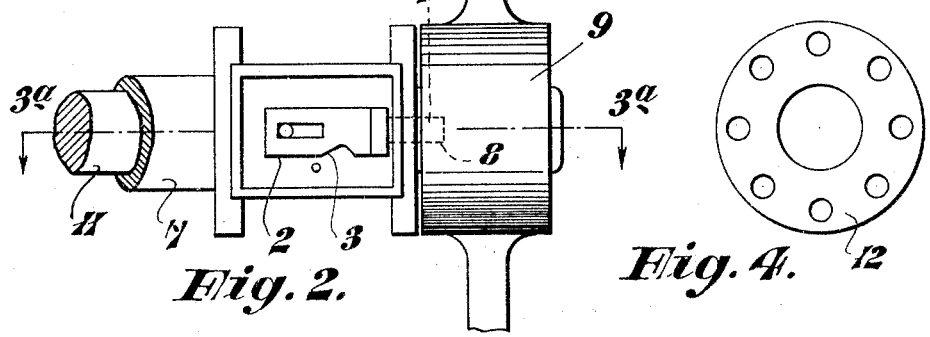
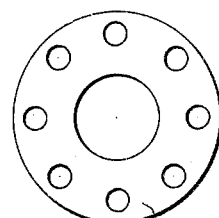
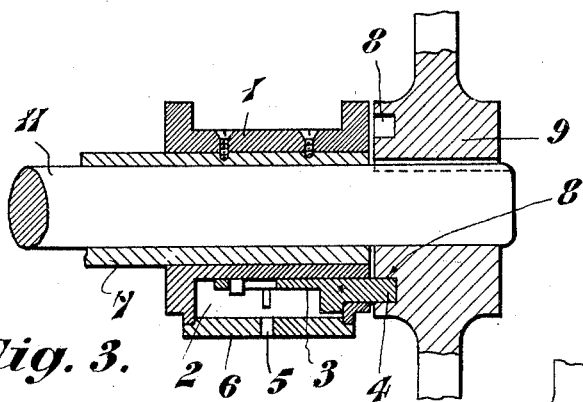
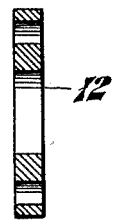
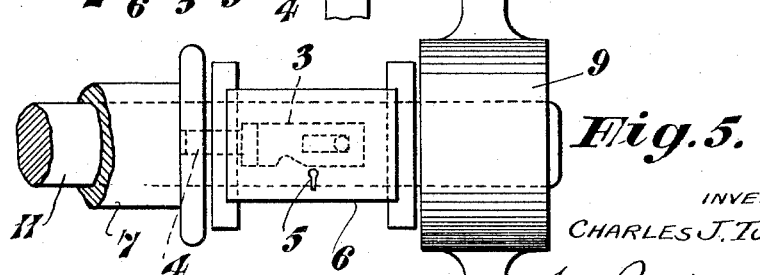
INVENTOR
CHARLES J. TURNER.

Patented Oct. 22, 1929

1,732,868

UNITED STATES PATENT OFFICE

CHARLES JAMES TURNER, OF CUBITT TOWN, LONDON, ENGLAND

ANTITHEFT DEVICE FOR USE ON MOTOR VEHICLES AND THE LIKE

Application filed October 1, 1926, Serial No. 138,957, and in Great Britain November 30, 1925.

This invention relates to an anti-theft device adapted to be associated with the steering columns of a motor vehicle or the like, for instance the steering pillar of a motor cycle or car, and has for its object to provide a simple and strong construction of such a device composed of as few parts as possible and which will be neat and inconspicuous.

More particularly my invention relates to the heretofore proposed type of antitheft device, which comprises a metal collar adapted to be secured around a steering pillar column or support and containing a slidable locking member adapted to be advanced from or retracted into the collar by a key or the like, such slidable locking member being adapted to be engaged in a recess, in a member carried by another part of the steering mechanism so as to lock the steering column or pillar to the support.

According to this invention, the lock is made in the form of a one piece sleeve or collar fitting over either the steering shaft or steering shaft casing and secured in place by means of a key or feather, brazing, welding, set pin or a combination of these. A recess is provided in one side of the collar or sleeve which is covered by a permanently affixed plate so as to provide an enclosed compartment to accommodate a slidable locking member adapted to be moved in a hole in the said collar or sleeve above the said compartment.

In cases where the steering shaft extends clear of the casing, the sleeve lock would be secured on the shaft with the face of the lock sleeve close up to the boss of the steering shaft casing and the bolt of the lock would slide into a hole or groove made in the face of the casing boss. These holes or grooves would be spaced out on the boss face so that the steering wheel could be locked in any position required.

In cases where the steering wheel is placed close to the boss of the steering shaft casing, the sleeve lock would be secured to the steering shaft casing and the lock bolt made to slide into a hole or groove in the boss of the steering wheel itself and spaced out as described above.

In the event of the arrangement of the steering wheel and casing not being adapted to the above conditions, on account of controlling gear of other parts being connected to either the shaft or casing, a collar could be fitted in a convenient position for the lock bolt to slide in.

In order that this invention may be clearly understood and readily carried into effect, I have appended hereto a sheet of drawings illustrating embodiments of same wherein Fig. 1 is a side elevation view showing the disposition of the device upon the steering pillar support or sleeve, Fig. 2 is an enlarged outside elevation view of the lock, Fig. 3 is a sectional view on the line $3^a$—$3^a$ of Fig. 2, Fig. 4 is a plan view of a suitable form of locking ring for use with the lock and adapted to be fixedly secured over the steering pillar, Fig. 5 is a view showing the lock attached to the steering pillar, and Fig. 6 is a sectional view of Fig. 4.

Referring to the drawings the device comprises a flanged metal sleeve or collar 1 having on one face a lock casing 2 within which is accommodated a tumbler locking device 3 or any other suitable form of lock. A latch member 4 adapted to be retracted and advanced by the operation of a suitable key inserted in the hole 5 in a plate 6 which constitutes the front face of the casing 2.

The sleeve or collar 1 can be secured rigidly and immovably to the steering column support or sleeve 7 by any suitable means, and the member 4 is adapted to be engaged in one of a number of holes 8 in the boss 9 of the steering wheel 10, (Figs. 1, 2 and 3). Alternatively the locks may be secured relatively immovably to the steering wheel column 11 as shown in Fig. 5, and the member 4 engaged in one of a number of holes in the top of the steering column support or sleeve 7, when it is not convenient to form the holes 8 in the boss 9 or the support 7, they may be formed in a collar 12 (Figs. 4 and 6) which can be securely fastened to the boss 9 or to the top of the support 7.

By means of the above invention a vehicle on coming to a standstill anywhere, could be locked by the owner, or person in charge, and the key taken away, and it would then be safe until required for further service.

What I claim is:—

An automobile steering gear locking device comprising in combination a steering column element, a steering shaft element rotatable in said column element, a one piece collar secured to one of said elements, said collar having a circumscribing groove providing spaced flanges, a locking device on the collar cooperating with the other element, said locking device having portions thereof formed by said spaced flanges and a cover for said locking device supported on the flanges, the latter and the cover having interfitting formations.

In witness hereof I have signed this specification.

CHARLES JAMES TURNER.